United States Patent
Guo et al.

(10) Patent No.: US 12,520,170 B2
(45) Date of Patent: Jan. 6, 2026

(54) WEATHER ADAPTIVE CONFIGURATION OF A WIRELESS NETWORKING DEVICE

(71) Applicant: Hewlett Packard Enterprise Development LP, Spring, TX (US)

(72) Inventors: Ting Guo, Beijing (CN); Jiyong Li, Beijing (CN); Guangzhi Ran, Beijing (CN); Qiang Zhou, Beijing (CN); Yunfei Bu, Beijing (CN); Kangchang Huang, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 396 days.

(21) Appl. No.: 18/155,185

(22) Filed: Jan. 17, 2023

(65) Prior Publication Data

US 2024/0244452 A1    Jul. 18, 2024

(51) Int. Cl.
*H04W 24/02*    (2009.01)
*H04W 24/08*    (2009.01)

(52) U.S. Cl.
CPC .......... *H04W 24/02* (2013.01); *H04W 24/08* (2013.01)

(58) Field of Classification Search
None
See application file for complete search history.

(56) References Cited

U.S. PATENT DOCUMENTS

| 6,390,921 | B1  | 5/2002  | Busch et al. |
|---|---|---|---|
| 8,693,361 | B2  | 4/2014  | Bejerano et al. |
| 9,007,978 | B2  | 4/2015  | Bejerano et al. |
| 9,332,054 | B2  | 5/2016  | Wilson et al. |
| 9,356,908 | B2  | 5/2016  | Velayudhapillai et al. |
| 10,110,602 | B2 | 10/2018 | Tomasso |
| 11,539,412 | B2 * | 12/2022 | Tofighbakhsh ...... H04B 7/0617 |
| 2020/0302319 | A1 | 9/2020 | Dawson et al. |
| 2020/0302320 | A1 | 9/2020 | Dawson et al. |
| 2021/0036918 | A1 | 2/2021 | Singla et al. |
| 2022/0394498 | A1 * | 12/2022 | Hatamian ......... H04W 74/0808 |
| 2023/0133824 | A1 * | 5/2023 | Hatamian ............. H04W 16/28 |

FOREIGN PATENT DOCUMENTS

WO    2014/033695 A1    3/2014

OTHER PUBLICATIONS

Guo, T., et al., "Weather adaptive outdoor", pp. 3.

* cited by examiner

*Primary Examiner* — Adolf Dsouza
(74) *Attorney, Agent, or Firm* — Hewlett Packard Enterprise Patent Department

(57) ABSTRACT

Radio frequency (RF) settings are communicated to a wireless networking device to adaptively configure it in events of weather changes. A network device may receive a weather metric corresponding to a wireless networking device and identify a target RF setting for the wireless networking device corresponding to the weather metric. Further, the network device may transmit the target RF setting to the wireless networking device to cause the wireless networking device to operate with the target RF setting thereby enhancing the performance of the wireless networking device.

16 Claims, 5 Drawing Sheets

WEATHER ADAPTIVE CONFIGURATION OF A WIRELESS NETWORKING DEVICE

BACKGROUND

A Wireless Local Area Network (WLAN) includes wireless networking devices, such as, access points and/or routers, hosted at several locations in a facility to provide wireless connectivity to client devices. Client devices such as laptops, personal computers, smartphones, etc. may connect to such wireless networking devices in the WLAN to exchange data with other wireless-capable devices. In some cases, for example in large-scale local network implementations, WLAN deployments may expand along multiple buildings. In such WLAN deployments, certain wireless networking devices may be configured to communicate with other wireless capable devices (e.g., the client devices or other wireless networking devices) deployed outside the buildings. In some cases, some of the wireless networking devices may as well be installed outside the buildings to extend wireless connectivity. As will be understood, the performance of such wireless networking devices may be impacted due to external weather conditions.

BRIEF DESCRIPTION OF THE DRAWINGS

One or more examples in the present disclosure are described in detail with reference to the following Figures. The Figures are provided for purposes of illustration only and merely depict examples.

Figure 1:
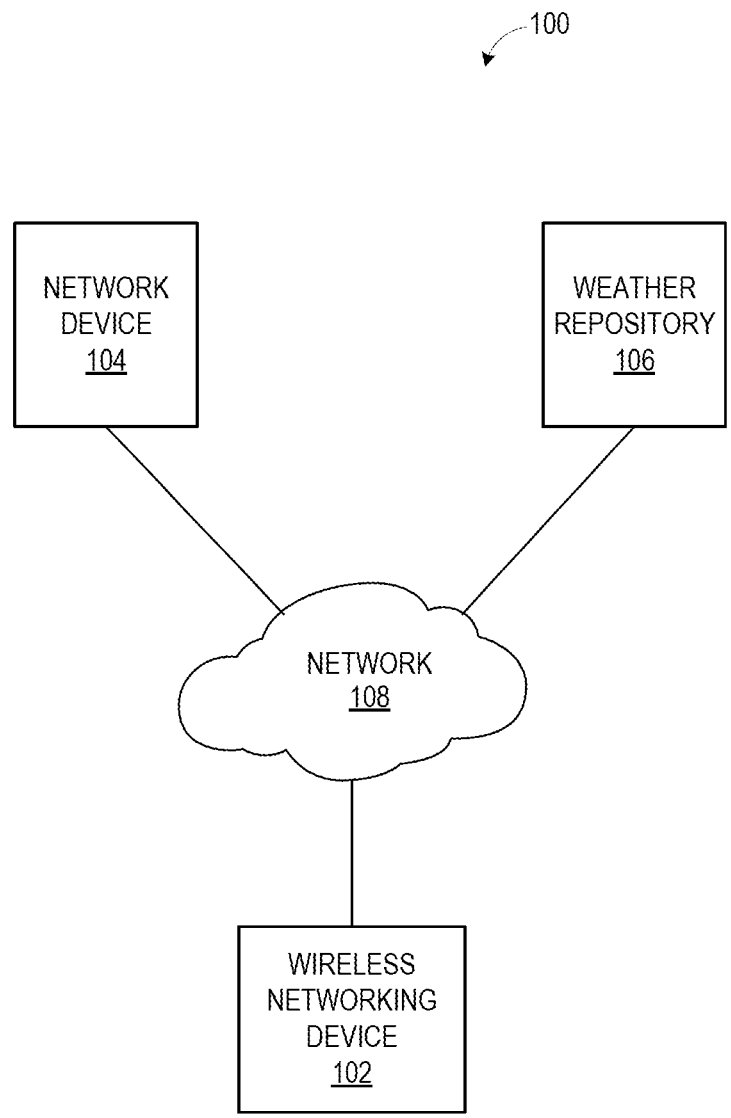
FIG. 1 depicts a networked system in which various of the examples presented herein may be implemented.

The Figures are not exhaustive and do not limit the present disclosure to the precise form disclosed.

DETAILED DESCRIPTION

Wireless networking devices may be deployed in WLANs to provide Wi-Fi connectivity to wireless-capable devices, also, referred to as client devices. In particular, the wireless networking devices may enable the client devices to communicate with other client devices or other wireless networking devices using wireless communication techniques, for example, ones specified in several Institute of Electrical and Electronics Engineers (IEEE) 802.11 standard specifications.

In certain WLAN deployments, some wireless networking devices are configured to provide Wi-Fi connectivity to client devices that are located outside of a building in which such wireless networking devices are installed. In particular, such wireless networking devices that communicate with other wireless networking devices or the client devices via a Wi-Fi connection that expands outside the building, or a Wi-Fi connection that spans through open spaces are referred to as outdoor wireless communication devices (e.g., an outdoor AP or an outdoor router). Such open spaces may be streets, roads, open fields, grounds, stadiums, gardens, or campuses, for example. The outdoor wireless networking devices may be deployed within the building or outside the building (for example, on external walls, towers, poles, or any mounting posts that may be exposed to weather conditions, such as, wind, rain, humidity, lightning, snow, etc.).

As it is apparent, weather conditions may impact the performance of wireless networking devices. In particular, weather conditions such as, wind, rain, humidity, lightning, and snow, may negatively impact the performance of outdoor wireless networking devices, for example, outdoor APs or outdoor routers. For instance, in some implementations, to provide long-distance coverage, an outdoor AP is usually installed on a pole (or tower). The pole may be impacted (e.g., rock, continuously or at random intervals shake or move the pole hosting the outdoor AP) due to strong winds. Such an impact of the wind on the pole may disturb a wireless signal path of the outdoor AP and thereby impact beamforming by the outdoor AP. Due to poor beamforming, any data communication by such an impacted outdoor AP may consume large airtime resulting in a reduced airtime efficiency of the outdoor AP.

Further, weather conditions involving high moisture or humidity may also impact the performance of the outdoor AP. In particular, a water molecule is polar, and it absorbs the energy of microwaves and heat. Such energy absorption by the water molecules, for example, in case of a dense fog or rain, may attenuate wireless signals (e.g., Wi-Fi signals) attenuates rapidly in dense fog or rain. As a result, the wireless signals may become weak and may not be able to travel a set distance.

Also, weather conditions such as, lightning may impact Wi-Fi signals. In particular, lightning can cause direct electromagnetic interference with Wi-Fi signals. Generally, the flashes of lightning are random and energy intensive which can cause serious damage to the Wi-Fi signals resulting in data/packet losses. Moreover, weather conditions such as, snow may contain snowflakes that are typically made of frozen water with acidic minerals. Such snowflakes may cause a reflection effect on microwaves. Wandering snowflakes in the air, make complex multi-path transmissions for the Wi-Fi signals which again deteriorates communication via the outdoor wireless device.

Typically, issues caused by any such weather conditions are addressed by manually investigating the issues to identify a root cause, locating the impacted wireless networking devices, and/or re-configuring such impacted wireless networking devices. Such a process to address these issues is labor-intensive, time-consuming, and costly.

In accordance with examples consistent with the present disclosure, a technique for improving the performance of a wireless networking device under varying weather conditions is presented. The wireless networking device may be of an indoor-type or an outdoor-type. An indoor-type wireless networking device, also referred to as an indoor wireless networking device, may be a wireless networking device that may facilitate a client device to communicate with other client devices or other wireless networking devices using wireless communication techniques in an indoor setting (e.g., within a building). Further, an outdoor-type wireless networking device may be a wireless networking device that may enable the client device to communicate with other client devices or other wireless networking devices using wireless communication techniques via a Wi-Fi connection that expands outside a building, or a Wi-Fi connection that spans through open spaces. The outdoor-type wireless networking device may also be referred to as an outdoor wireless networking device.

In accordance with the examples presented herein, a centralized entity, for example, a network device may be communicatively coupled to the wireless networking device. The network device may be configured to monitor weather conditions around the wireless networking device and configure the wireless networking device to minimize any negative impact of weather changes on the performance of the wireless networking device. In particular, the network device may be configured to receive a weather metric corresponding to the wireless networking device. The weather metric may be indicative of a weather condition (e.g., wind, temperature, humidity, lightning, snow, rain, or combinations thereof) in a predefined area encompassing the wireless networking device. By way of example, the weather metric may be a wind speed expressed in kilometers/hour (kmph) or humidity expressed in grams of water vapor per cubic meter of air. The network device may determine or obtain the weather metric using a weather report downloaded from a subscribed weather repository or using a weather measurement obtained via a sensor installed with the wireless networking device.

Further, the network device may identify a target radio frequency (RF) setting for the wireless networking device corresponding to the weather metric. The target RF setting may comprise network settings that may cause the wireless networking device to operate at a better performance if such a setting is implemented. Examples of the target RF setting may include values and/or status indicators for parameters such as a transmit power, beamforming status, fragment threshold, Aggregated Media Access Control Protocol Data Unit (AMPDU) size, a Guard Interval (GI), or combinations thereof. For instance, the target RF setting may define a configuration of the wireless networking device at which the throughput of the wireless networking device may be increased and/or channel utilization by the wireless networking device may be decreased for a given weather metric. Once, the target RF setting is identified, the network device may transmit the target RF setting to the wireless networking device to cause the wireless networking device to operate with the target RF setting thereby enhancing the performance of the wireless networking device.

The network device may select the target RF setting for the wireless networking device from several performance-oriented RF settings stored in an RF setting knowledge base. In particular, the network device may be configured to learn the performance-oriented RF settings for several weather conditions during a training phase or a data collection phase. During the data collection phase, for a given weather metric, the network device may test several RF settings on the wireless networking device and receive performance measurements such as, channel utilization and throughput for each of the several RF settings. Then, the network device may determine a performance metric (e.g., a ratio of the throughput and the channel utilization) based on the received performance measurements and select an RF setting based on the performance metric. For example, the network device may select the RF setting as a performance-oriented RF setting for which the performance metric is the maximum. Further, the network device may store the weather metric and the selected RF setting in the RF setting knowledge base. Likewise, the network device may develop the RF setting knowledge base comprising a mapping between predefined weather metrics and respective performance-oriented RF settings. Such mapping may be referenced by the network device to identify the target RF setting for the wireless networking device.

The following detailed description refers to the accompanying drawings. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Before describing examples of the disclosed systems and methods in detail, it is useful to describe an example network installation with which these systems and methods might be implemented in various applications. FIG. 1 illustrates a networked system 100 (hereinafter referred to as system 100) in which various of the examples presented herein may be implemented. The system 100 may include a wireless networking device 102, a network device 104, and a weather repository 106. In some examples, the system 100 may be a distributed system in which the wireless networking device 102, the network device 104, and the weather repository 106 may be located at physically different locations (e.g., on different racks, on different enclosures, in different buildings, in different cities, in different countries, and the like) while being communicatively coupled to each other via a network 108. The term "communicatively coupled" may refer to a connection between two entities that enables the communication of data between the two entities. Such connection between the two entities may be wired, wireless, or an optical communication connection.

The wireless networking device 102 may be a communication device to enable the client devices (not shown) to communicate with other client devices or other wireless networking devices using wireless communication techniques. The wireless communication techniques may be techniques specified in one or more IEEE 802.11 standard specifications, for example. In some examples, the wireless networking device 102 may include devices such as, access points (APs), wireless local area network (WLAN) controllers, network switches, gateway devices, routers, client devices, and the like. Examples of the client devices may include desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smartphones, smart terminals, dumb terminals, virtual terminals, video game consoles, virtual assistants, Internet of Things (IoT) devices, and the like.

In some examples, the wireless networking device 102 may be an indoor wireless networking device or an outdoor wireless networking device. For the purpose of illustration hereinafter, the wireless networking device 102 is described as being an outdoor AP that may provide wireless connectivity to respective client devices as per supported Wi-Fi standards, for example, various IEEE 802.11 standards. As will be understood, the wireless networking devices, more prominently, the outdoor wireless networking devices, may experience physical and/or electromagnetic impacts caused by the weather conditions. Moreover, the weather conditions are subject to changes due to several factors including, time of the year, seasons, climate changes, natural calamities, etc.

The weather repository 106 may refer to a source of weather-related data, for example, current weather conditions and/or weather forecasts. The weather repository 106 may be accessible by the network device via the network 108. Examples of the sources that may be used as the weather repository 106 may include weather sources, for example, Accuweather, Weather Bureau, Google, and/or Yahoo. It may be noted that the present disclosure is not limited with reference to any particular source of weather-related data.

Further, examples of the network 108 may include, but are not limited to, an Internet Protocol (IP) or non-IP-based local area network (LAN), a WLAN, a metropolitan area network (MAN), a wide area network (WAN), a storage area network (SAN), a personal area network (PAN), a cellular communication network, a Public Switched Telephone Network (PSTN), and the Internet. In some examples, the network 108 may include one or more network switches, routers, or network gateways to facilitate data communication. Communication over the network 108 may be performed in accordance with various communication protocols such as but not limited to, Transmission Control Protocol and Internet Protocol (TCP/IP), User Datagram Protocol (UDP), IEEE 802.11, and/or cellular communication protocols. The communication over the network 108 may be enabled via wired (e.g., copper, optical communication, etc.) or wireless (e.g., Wi-Fi®, cellular communication, satellite communication, Bluetooth, etc.) communication technologies. In some examples, the network 108 may be enabled via private communication links including, but not limited to, communication links established via Bluetooth, cellular communication, optical communication, RF communication, wired (e.g., copper), and the like. In some examples, the private communication links may be direct communication links between the wireless networking device 102, the network device 104, and the weather repository 106.

In order to minimize the adverse effects of weather changes on the performance of the wireless networking device 102, the system 100 includes the network device 104. In some examples, the network device 104 may be another wireless networking device. In some examples, the network device 104 may be implemented as a WLAN controller which may be communicatively coupled to the wireless networking device 102. In some other examples, the network device 104 may be implemented as a physical computing system (e.g., desktop computers, laptop computers, servers, etc.) having data processing and/or data storage capabilities. In certain examples, the network device 104 may be implemented as a virtual computing system such as, a virtual machine, a container, a pod, or combinations thereof. In some examples, the network device 104 may be implemented on a cloud platform as a service enabled via physical computing systems and/or virtual computing systems. The network device 104 as the service may be consumed on a subscription basis, for example, on a pay-per-use basis. Additional details about an example network device are described in conjunction with a block diagram of FIG. 2.

In accordance with the examples presented herein, the network device 104 may be configured to improve the performance of the wireless networking device 102 under varying weather conditions which would otherwise be impacted due to the varying weather conditions. In particular, during a learning phase, the network device 104 may be configured to monitor the weather conditions and learn performance-oriented RF settings for the wireless networking device 102 for a given weather condition. For example, during the learning phase, over a period, the network device 104 may learn the performance-oriented RF settings for several weather conditions and build an RF setting knowledge base. During a real-time operation of the wireless networking device 102, the network device 104 may continue to monitor the weather conditions and select a target RF setting from the performance-oriented RF settings based on the weather condition. The network device 104 may then transmit the target RF setting to the wireless networking device 102. Accordingly, the wireless networking device 102 may implement the target RF setting and operate with better performance. Example methods of configuring a wireless networking device, for example, the wireless networking device 102 are described in conjunction with FIGS. 3 and 4.

Figure 2:
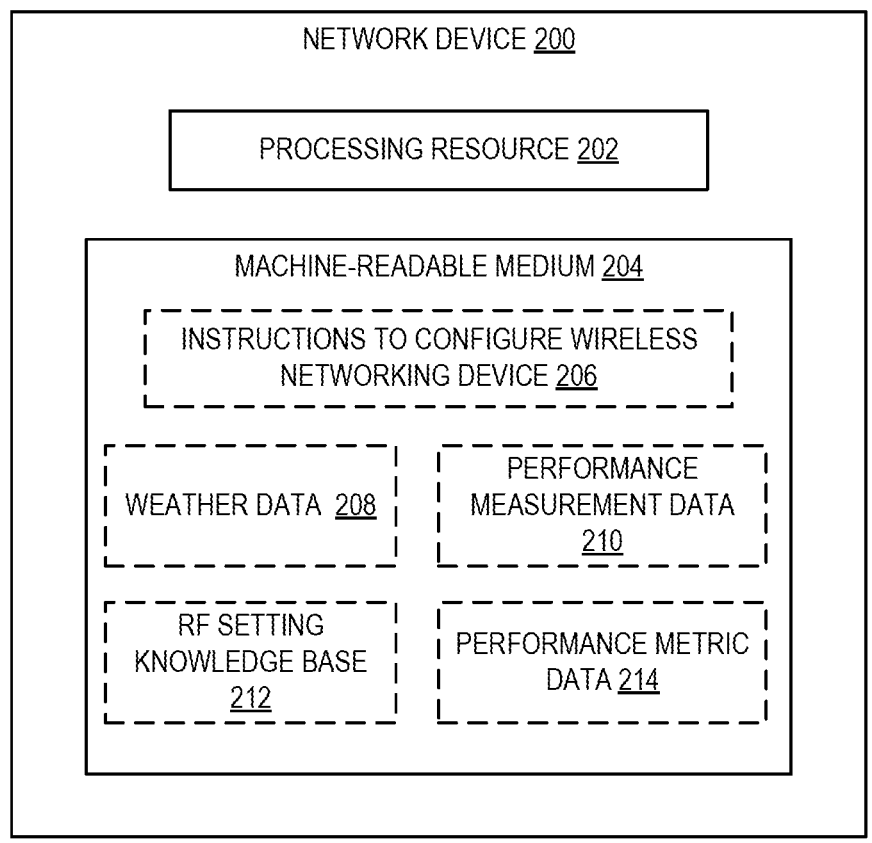
FIG. 2 depicts an example network device including a processing resource and a machine-readable storage medium.

Referring now to FIG. 2, a block diagram of an example network device 200 is presented. The network device 200 of FIG. 2 may be an example representative of the network device 104 of FIG. 1 and is operable to dynamically configure the wireless networking devices (e.g., the wireless networking device 102) under varying weather conditions to minimize negative impacts of the weather changes on the performance of the wireless networking device. In some examples, the network device 200 may include a processing resource 202 and/or a machine-readable storage medium 204 for the network device 200 to execute several operations as will be described in the greater details below.

The machine-readable storage medium 204 may be non-transitory and is alternatively referred to as a non-transitory machine-readable storage medium that does not encompass transitory propagating signals. The machine-readable storage medium 204 may be any electronic, magnetic, optical, or another type of storage device that may store data and/or executable instructions. Examples of the machine-readable storage medium 204 may include Random Access Memory (RAM), non-volatile RAM (NVRAM), an Electrically Erasable Programmable Read-Only Memory (EEPROM), a storage drive (e.g., a solid-state drive (SSD) or a hard disk drive (HDD)), a flash memory, and the like. The machine-readable storage medium 204 may be encoded with instructions 206 (depicted using a dashed box in FIG. 2) for configuring a wireless networking device dynamically as per weather conditions. Although not shown, in some examples, the machine-readable storage medium 204 may be encoded with certain additional executable instructions to perform any other operations performed by the network device 200, without limiting the scope of the present disclosure. Further, in some examples, the machine-readable storage medium 204 may be encoded with a weather data 208, a performance measurement data 210, an RF setting knowledge base 212, and performance metric data 214 (depicted using dashed boxes in FIG. 2).

The weather data 208 may represent a store of data representative of weather conditions. For example, the processing resource 202 may store the weather metrics in the weather data 208. Further, the performance measurement data 210 represent a store of performance parameter measurements received from a wireless networking device. In particular, the performance parameter measurements (e.g., channel utilization, throughput, etc.) corresponding to several RF settings may be stored in the performance measurement data 210. The RF setting knowledge base 212 may represent a store of data representative of performance metrics corresponding to the wireless networking device. In particular, the processing resource 202 may be configured to calculate performance metrics for several weather metrics based on respective performance parameter measurements and store the calculated performance metrics in the performance metric data 214.

The processing resource 202 may be a physical device, for example, a central processing unit (CPU), a microprocessor, a graphics processing unit (GPU), a field-programmable gate array (FPGA), application-specific integrated circuit (ASIC), other hardware devices capable of retrieving and executing instructions stored in the machine-readable storage medium 204, or combinations thereof. The processing resource 202 may fetch, decode, and execute the instructions 206 stored in the machine-readable storage medium 204 to dynamically configure the wireless networking device as per weather conditions. As an alternative or in addition to executing the instructions 206, the processing resource 202 may include at least one integrated circuit (IC), control logic, electronic circuits, or combinations thereof that include a number of electronic components for performing the functionalities intended to be performed by the network device 200. In implementations, the processing resource 202 and the machine-readable storage medium 204 may be representative of the processing resource and the machine-readable storage medium of a host computing system hosting the network device 200 as a service, application, or a virtual resource (e.g., a virtual machine or a container).

In accordance with examples consistent with the present disclosure, the network device 200 implements, by way of the processing resource 202 executing the instructions 206, a method of dynamically configuring the wireless networking device in accordance with weather conditions. In particular, in some examples, the processing resource 202 may execute one or more of the instructions 206 to perform the method steps described in conjunction with FIGS. 3 and 4.

Figure 3:
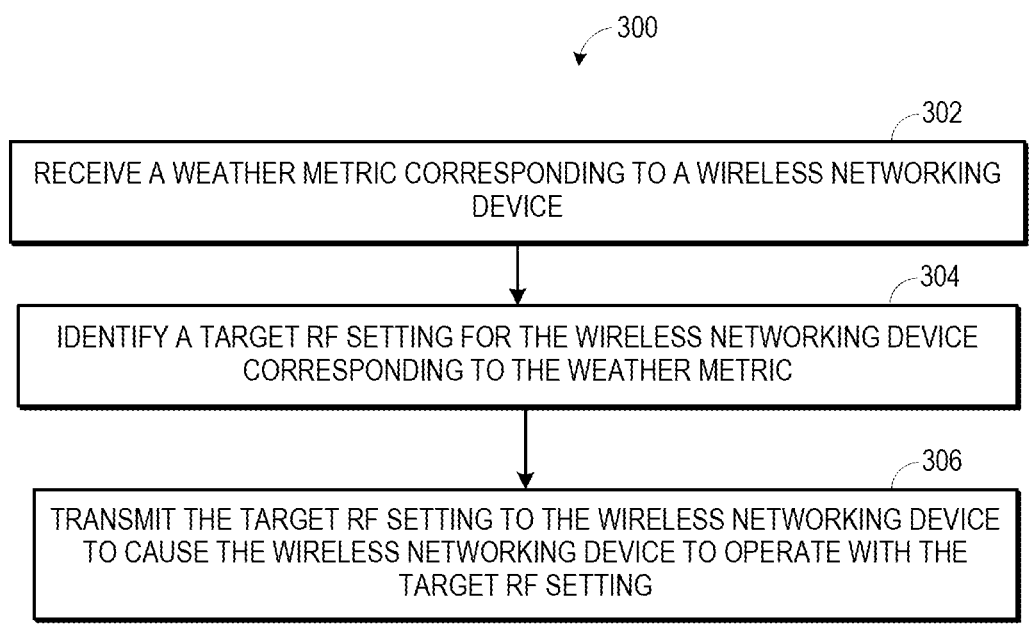
FIG. 3 depicts a flowchart of an example method for configuring a wireless networking device.

Referring now to FIG. 3, a flowchart of an example method 300 for dynamically configuring a wireless networking device, for example, the wireless networking device 102 of FIG. 1, based on a weather condition is depicted. In some examples, the steps shown in FIG. 3 may be performed by any suitable device, such as a network device (e.g., the network device 104, 200). In some examples, the suitable device may include a hardware processing resource, such as one or more central processing units (CPUs), semiconductor-based microprocessors, and/or other hardware devices suitable for retrieval and execution of instructions (e.g., the instructions 206 depicted in FIG. 2) stored in a machine-readable storage medium. The processing resource may fetch, decode, and execute instructions, to configure the wireless networking device. As an alternative or in addition to retrieving and executing instructions, the processing resource may include one or more electronic circuits that include electronic components for performing the functionality of one or more instructions, such as an FPGA, ASIC, or other electronic circuits. The processing resource and the machine-readable storage medium may be example representatives of the processing resource 202 and the machine-readable storage medium 204 of the network device 200.

At step 302, the network device may be configured to receive a weather metric corresponding to the wireless networking device. The weather metric may be a measure of a weather condition (e.g., wind, temperature, humidity, lightning, snow, rain, or combinations thereof) in a predefined area encompassing the wireless networking device. By way of example, the weather metric may be a wind speed expressed in kilometers/hour (km/h), humidity content expressed in grams of water vapor per cubic meter of air, a rainfall in millimeters (mm), a snowfall in inches and tenths, an amount of lightning in Lumens, or the like. As previously indicated, the network device may determine or obtain the weather metric using a weather report downloaded from a subscribed weather repository (e.g., the weather repository 106) or using a weather measurement obtained via a weather condition sensor installed with the wireless networking device. Examples of the weather condition sensor may include a temperature sensor, a pressure sensor, a windspeed sensor, a lightning sensor, a humidity sensor, a rain sensor, a snow sensor, or combinations thereof. To obtain the weather metric, the network device may, periodically or at random intervals, poll the weather repository and/or the weather condition sensor. In certain examples, the weather repository and/or the weather condition sensor may, periodically or upon demand from the network device, may send the weather report and/or the weather metric to the network device. Upon receipt or determination of the weather metric, the network device may store the weather metric in a weather data (e.g., the weather data 208) in the network device.

Further, at step 304, the network device may identify a target RF setting for the wireless networking device corresponding to the weather metric. The target RF setting may comprise network settings that may cause the wireless networking device to operate at a better performance if such an RF setting is implemented. Examples of the network settings may include values and/or status indicators for parameters such as a transmit power, beamforming settings, a fragment threshold, an AMPDU size, a GI, or combinations thereof. The target RF setting may define a configuration of the wireless networking device at which the throughput of the wireless networking device may be increased and/or channel utilization by the wireless networking device may be decreased for a given weather metric.

For example, if a value of the weather metric indicates that there is a snowfall in an area where the wireless networking is installed, the network device may identify a target RF setting for the wireless networking device corresponding to the value of the weather metric from an RF setting knowledge base. In case of the detection of snowfall, the network device may select a target RF setting that has a longer GI compared to the current value of the GI configured for the wireless networking device. Also, in some examples, the target RF, in case of snowfall detection, may include a setting for disabling beamforming by the wireless networking device. Following is a syntax (e.g., syntax-1) of an example target RF setting in case the weather metric is indicative of the snowfall at the site of the wireless networking device.

"he-guard-interval 3200 ns
short-guard-interval-disable
vht-txbf-explicit-disable
he-txbf-disable
he-mu-ofdma-disable
he-mu-mimo-disable
vht-mu-txbf-disable"

Syntax-1: Example target RF setting

For certain wireless networking devices, for example, APs, 3200 nanoseconds (ns) long GI is the maximum. Also, the syntax-1 indicates several features such as, short GI (indicated via "short-guard-interval-disable"), explicit transmit beamforming for very high throughput (indicated via "vht-txbf-explicit-disable"), transmit beamforming for high-efficiency (indicated via "vht-txbf-explicit-disable"), high-efficiency multiuser orthogonal frequency division multiple access (indicated via "he-mu-ofdma-disable"), high-efficiency Multiple-Input Multiple-Output (indicated via "hemu-mimo-disable"), and very high throughput Multiuser beamforming (indicated via "vht-mu-txbf-disable").

Further, in situations where the weather metric indicates a high wind condition at the site of the wireless networking devices, the network device may select a target RF setting that causes beamforming should be turned off (e.g., such target setting may include vht-txbf-explicit-disable, he-txbf-disable, and/or vht-mu-txbf-disable). Furthermore, in situations where the weather metric indicates a high moisture/humidity at the site of the wireless networking devices, the network device may select a target RF setting that causes the transmit power of the wireless networking device to increase. Moreover, in situations where the weather metric indicates lightning at the site of the wireless networking devices, the network device may select a target RF setting that applies a smaller fragment threshold or AMPDU size, which reduces the airtime cost for packet retry under lightning.

Once, the target RF setting is identified, at step 306, the network device may transmit the target RF setting to the wireless networking device to cause the wireless networking device to operate with the target RF setting thereby enhancing the performance of the wireless networking device.

Figure 4:
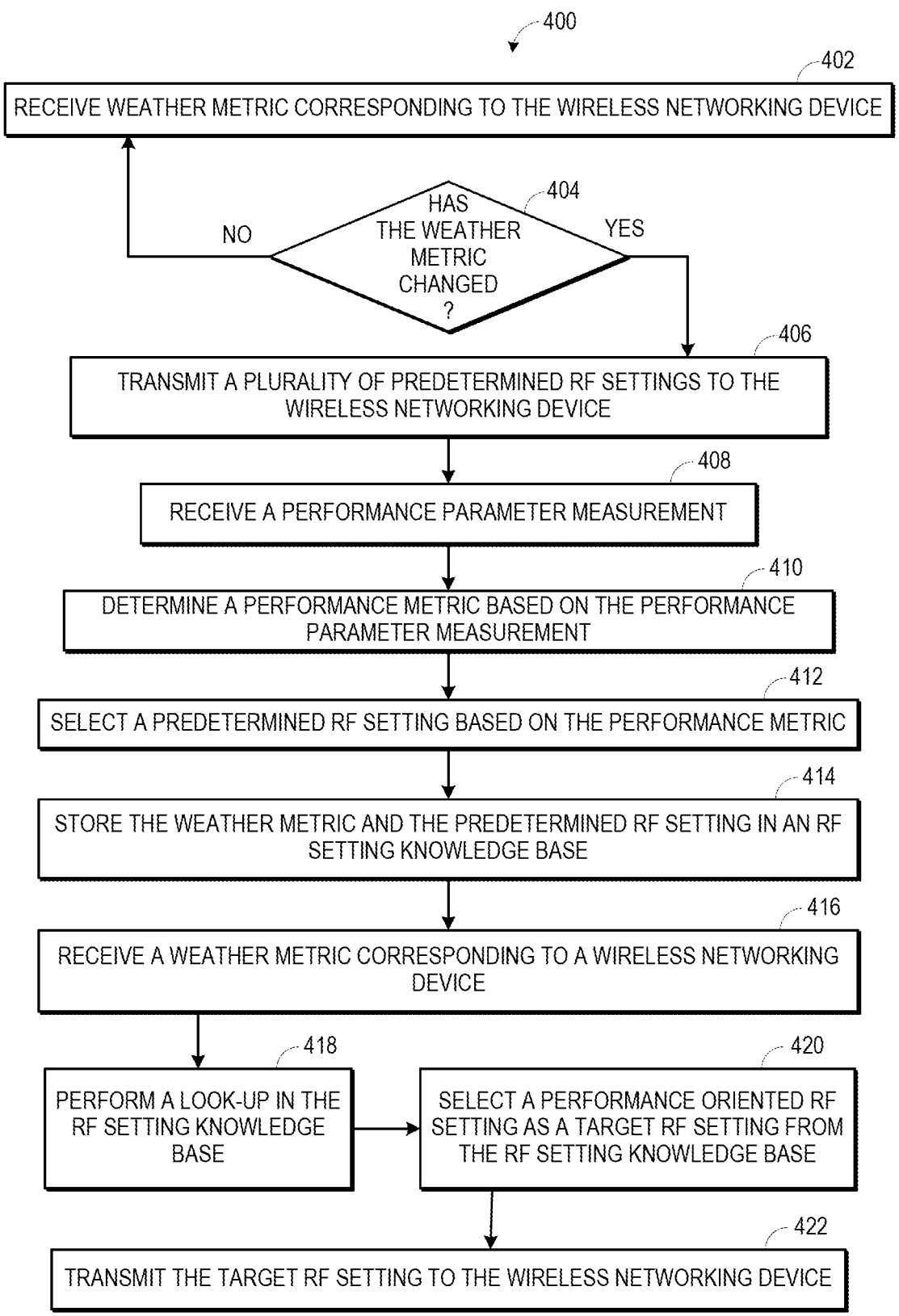
FIG. 4 depicts a flowchart of an example method for configuring a wireless networking device.

Turning now to FIG. 4 a flowchart of an example method 400 for dynamically configuring a wireless networking device, for example, the wireless networking device 102 of FIG. 1, based on a weather condition is depicted. The method 400 of FIG. 4 may be an example representative of the method 300 of FIG. 3. The method 400 includes certain steps similar to those described in conjunction with the method 300, certain description of which is not repeated herein for the sake of brevity. In some examples, the steps shown in FIG. 4 may be performed by any suitable device, such as a network device (e.g., the network device 104, 200) by way of executing instructions (e.g., the instructions 206 depicted in FIG. 2) via a processing resource. In particular, the method 400 includes several steps in order, however, the order of steps shown in FIG. 4 should not be construed as the only order for the steps. The steps may be performed at any time, in any order. Additionally, the steps may be repeated or omitted as needed.

In accordance with the examples presented herein, the network device may be configured to learn performance-oriented RF settings for several weather conditions during a training phase or a data collection phase. During the data collection phase, the network device may test several RF settings on the wireless networking device for a given weather metric to learn the performance-oriented RF settings. The performance-oriented RF settings may refer to the RF settings for which the wireless networking device performs with improved performance. Details of the data collection phase are described in with help of steps 402 through 414. At the end of the data collection phase, the network device may develop an RF setting knowledge base comprising a mapping between predefined weather metrics and respective performance-oriented RF settings. The RF setting knowledge base may be referenced by the network device to identify the target RF setting for the wireless networking device during the real-time operation (e.g., described in steps 416 through 422) of the wireless networking device.

In particular, in the data collection phase, at step 402, the network device may receive a weather metric corresponding to the wireless networking device. As previously noted, the weather metric may be a measure (e.g., wind speed, humidity/moisture content in the air, amount of rainfall, amount of snowfall, amount of lightning, etc.) of a weather condition in a predefined area encompassing the wireless networking device.

Further, at step 404, the network device may perform a check to determine if the weather metric has changed (i.e., increased or decreased) by a predetermined magnitude. For example, a check may be performed to determine if the windspeed has increased by a predetermined magnitude of, for example, 10 kmph. At step 404, if it is determined that the weather metric has not changed by the predetermined magnitude, the network device may continue to receive and monitor the weather metric. However, at step 404, if it is determined that the weather metric has changed by the predetermined magnitude, the network device, at step 406, may transmit a plurality of predetermined RF settings to the wireless networking device. In some examples, the plurality of predetermined RF settings may include a plurality of combinations of one or more of the transmit power, the beamforming settings, the fragment threshold, the AMPDU size, the GI, or combinations thereof depending on the weather metric. The network device may send the plurality of predetermined RF settings together in one transmission or one after another in individual transmissions.

Upon receiving the predetermined RF settings, the wireless network device may implement a predetermined RF setting and generate performance parameter measurement for the implemented predetermined RF setting. Likewise, the wireless network device may implement each of the plurality of predetermined RF settings and generate performance parameter measurements for each of the plurality of predetermined RF settings. In one example, the performance parameter measurements may include channel utilization and throughput of the wireless networking device. For a given wireless networking device, the term "channel utilization" may refer to a fraction or percentage of the time that the given wireless networking device uses a communication channel to communicate with other devices (e.g., client devices). Further, the term "throughput" for the given wireless networking device may refer to an amount of data that is successfully sent/received by the wireless networking device over a communication channel. In some examples, for each of the predetermined RF settings implemented by the wireless networking device, the wireless networking device may send multiple measurements of the channel utilization and throughput to the network device.

Accordingly, at step 408, the network device may receive the performance parameter measurement (e.g., the channel utilization and throughput) from the wireless networking device corresponding to each of the plurality of predetermined RF settings. The network device may store the performance parameter measurements received from the wireless networking device in a performance measurement data (e.g., performance measurement data 210 of FIG. 2).

Further, at step 410, the network device may determine a performance metric for the wireless networking device based on the performance parameter measurement. The performance metric may be a value representative of the performance of the wireless networking device. In an example, the network device may determine the performance metric using the relationship of Equation 1.

$$\text{Performance Metric} = \frac{\text{Throughput}}{\text{Channel Utilization}} \quad \text{Equation (1)}$$

It is to be noted that the calculation of the performance metric as a ratio of the throughput and the channel utilization as represented via Equation (1) is just one example way of calculating the performance metric. The use of any other formulas to determine the performance metric based on these or any other performance parameter measurement is also envisioned within the purview of the present disclosure.

Likewise, the network device may calculate the performance metric for each of the predetermined RF settings and store the calculated performance metrics in a performance metric data (e.g., the performance metric data 214 shown in FIG. 2).

Additionally, at step 412, the network device may select, for the weather metric (e.g., weather metric for which the network device had sent the predetermined RF settings to the wireless networking device at step 406), one of the predetermined RF settings as a performance-oriented RF setting. In one example, the network device may select a predetermined RF setting for which the value of the performance metric is determined to the highest/maximum, as the performance-oriented RF setting. As will be appreciated, the use of any other criteria for selecting the performance-oriented RF setting is also envisioned within the purview of the present disclosure.

Then, at step 414, the network device may store the weather metric and the selected RF setting (i.e., the performance-oriented RF setting) in the RF setting knowledge base (e.g., the RF setting knowledge base 212 shown in FIG. 2). Likewise, the network device may develop the RF setting knowledge base comprising a mapping between predefined weather metrics and respective performance-oriented RF settings.

During a real-time operation of the wireless networking device, at step 416, the network device may receive a weather metric corresponding to the wireless networking device. Further, the network device may identify (steps 418 and 420) a target RF setting for the wireless networking device corresponding to the weather metric. The target RF setting may comprise network settings that may cause the wireless networking device to operate at a better performance if such a setting is implemented. In some examples, to identify the target RF setting, at step 418, the network device may perform a look-up in the RF setting knowledge base. In particular, the network device may search for the performance-oriented RF setting that matches the weather metric (received at step 416) from the RF setting knowledge base.

Further, at step 420, the networking device may select a performance-oriented RF setting as the target RF setting based on a match between the weather metric and the plurality of predefined weather metrics. Once, the target RF setting is identified, at step 422, the network device may transmit the target RF setting to the wireless networking device. The wireless networking device may update its configuration as per the target RF setting and which would result in enhancing the performance of the wireless networking device.

Figure 5:
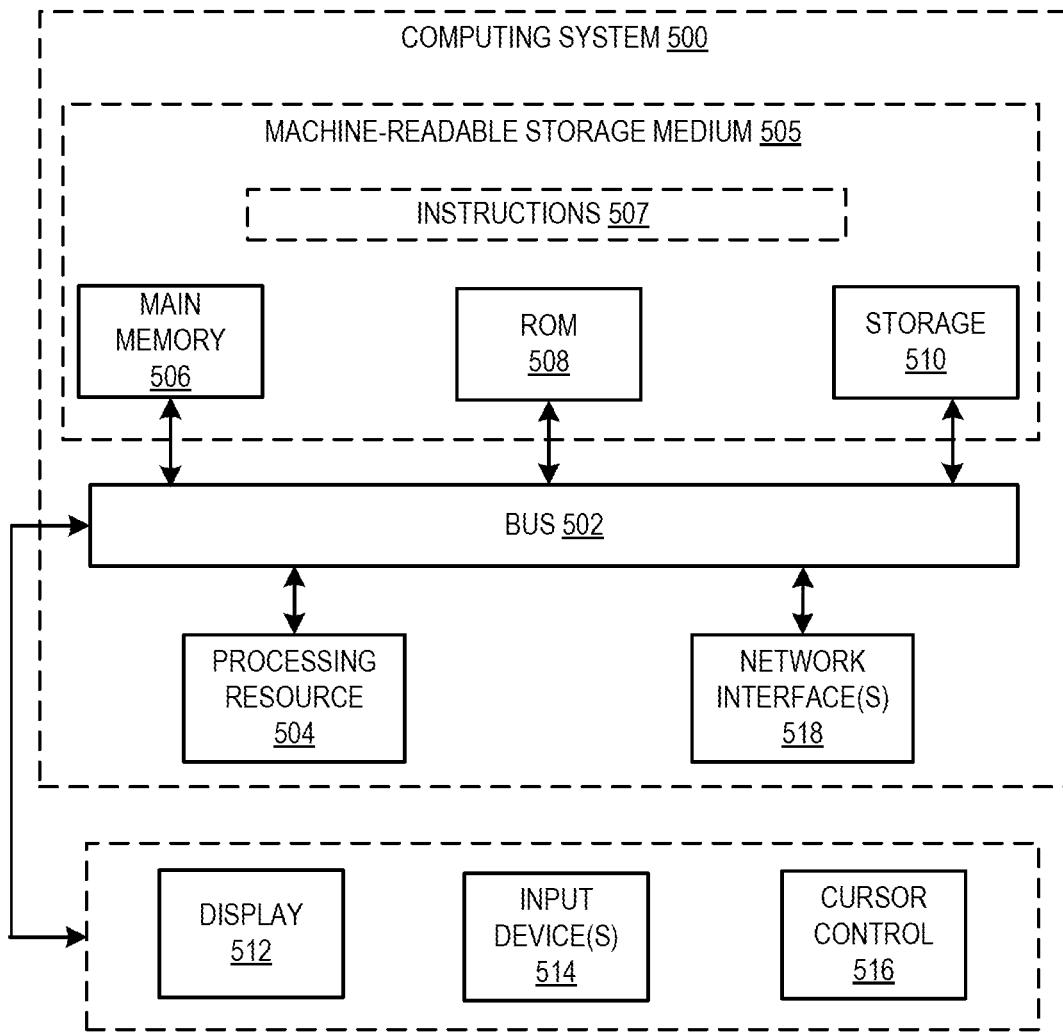
FIG. 5 depicts a block diagram of an example computing system.

FIG. 5 depicts a block diagram of an example computing system 500 in which various of the examples described herein may be implemented. In some examples, the computing system 500 may be configured to operate as the network device 104 of FIG. 1 and can perform various operations described in one or more of the earlier drawings. In some other examples, the computing system 500 may be a WLAN controller. Examples of the devices and/or systems that may be implemented as the computing system 500 may include, desktop computers, laptop computers, servers, web servers, mainframes, tablet computers, e-readers, netbook computers, PDAs, mobile phones, smartphones, smart terminals, dumb terminals, virtual terminals, and the like.

The computing system 500 may include a bus 502 or other communication mechanisms for communicating information, a hardware processor, also referred to as processing resource 504, and a machine-readable storage medium 505 coupled to the bus 502 for processing information. In some examples, the processing resource 504 may include one or more CPUs, semiconductor-based microprocessors, and/or other hardware devices suitable for retrieval and execution of instructions stored in a machine-readable storage medium 505. The processing resource 504 may fetch, decode, and execute instructions to configure the wireless networking device. As an alternative or in addition to retrieving and executing instructions, the processing resource 504 may include one or more electronic circuits that include electronic components for performing the functionality of one or more instructions, such as an FPGA, an ASIC, or other electronic circuits.

In some examples, the machine-readable storage medium 505 may include a main memory 506, such as a RAM, cache and/or other dynamic storage devices, coupled to the bus 502 for storing information and instructions to be executed by the processing resource 504. The main memory 506 may also be used for storing temporary variables or other intermediate information during the execution of instructions to be executed by the processing resource 504. Such instructions, when stored in storage media accessible to the processing resource 504, render the computing system 500 into a special-purpose machine that is customized to perform the operations specified in the instructions. The machine-readable storage medium 505 may further include a read-only memory (ROM) 508 or other static storage device coupled to the bus 502 for storing static information and instructions for the processing resource 504. Further, in the machine-readable storage medium 505, a storage device 510, such as a magnetic disk, optical disk, or USB thumb drive (Flash drive), etc., may be provided and coupled to the bus 502 for storing information and instructions.

In some examples, the computing system 500 may be coupled, via the bus 502, to a display 512, such as a liquid crystal display (LCD) (or touch-sensitive screen), for displaying information to a computer user. In some examples, an input device 514, including alphanumeric and other keys (physical or software generated and displayed on a touch-sensitive screen), may be coupled to the bus 502 for communicating information and command selections to the processing resource 504. Also, in some examples, another type of user input device may be a cursor control 516, such as a mouse, a trackball, or cursor direction keys may be connected to the bus 502. The cursor control 516 may communicate direction information and command selections to the processing resource 504 for controlling cursor movement on the display 512. In some other examples, the same direction information and command selections as cursor control may be implemented via receiving touches on a touch screen without a cursor.

In some examples, the computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The computing system 500 also includes a network interface 518 coupled to bus 502. The network interface 518 provides a two-way data communication coupling to one or more network links that are connected to one or more local networks. For example, the network interface 518 may be an integrated services digital network (ISDN) card, cable modem, satellite modem, or a modem to provide a data communication connection to a corresponding type of telephone line. As another example, the network interface 518 may be a local area network (LAN) card or a wireless communication unit (e.g., Wi-Fi chip/module).

In some examples, the machine-readable storage medium 505 (e.g., one or more of the main memory 506, the ROM 508, or the storage device 510) stores instructions 507 which when executed by the processing resource 504 may cause the processing resource 504 to execute one or more of the methods/operations described hereinabove. The instructions 507 may be stored on any of the main memory 506, the ROM 508, or the storage device 510. In some examples, the instructions 507 may be distributed across one or more of the main memory 506, the ROM 508, or the storage device 510. In some examples, when the computing system 500 is configured to operate as a network device 104, the instructions 507 may include instructions that when executed by the processing resource 504 may cause the processing resource 504 to perform one or more of the methods described in FIGS. 3 and 4. In some examples, one or more of the instructions 507 when executed by the processing resource 504 may cause the processing resource 504 to receive a weather metric corresponding to a wireless networking device (e.g., an outdoor AP), identify a target RF setting for the wireless networking device corresponding to the weather metric, and transmit the target RF setting to the wireless networking device to cause the wireless networking device to operate with the target RF setting thereby enhancing the performance of the wireless networking device.

Terms and phrases used in this document, and variations thereof, unless otherwise expressly stated, should be construed as open-ended as opposed to limiting. As examples of the foregoing, the term "including" should be read as meaning "including, without limitation" or the like. The term "example" is used to provide exemplary instances of the item in the discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent. Further, the term "and/or" as used herein refers to and encompasses any and all possible combinations of the associated listed items. It will also be understood that, although the terms first, second, third, etc., may be used herein to describe various elements, these elements should not be limited by these terms, as these terms are only used to distinguish one element from another unless stated otherwise or the context indicates otherwise.

What is claimed is:

1. A method comprising:
   receiving, by a network device, a weather metric corresponding to a wireless networking device;
   developing, by the network device during a training phase, an RF setting knowledge base comprising a mapping between a plurality of predefined weather metrics and a plurality of performance-oriented RF settings, wherein developing the RF setting knowledge base comprises:
      receiving, by the network device, the weather metric corresponding to the wireless networking device;
      transmitting, by the network device, a plurality of predetermined RF settings to the wireless networking device in response to determining that the weather metric has changed by a predetermined magnitude;
      receiving a performance parameter measurement from the wireless networking device corresponding to each of the plurality of predetermined RF settings;
      determining a performance metric based on the performance parameter measurement;
      selecting a predetermined RF setting of the plurality of predetermined RF settings based on the performance metric; and
      storing the weather metric and the predetermined RF setting in the RF setting knowledge base;
   identifying, by the network device, a target radio frequency (RF) setting for the wireless networking device corresponding to the weather metric; and
   transmitting, by the network device, the target RF setting to the wireless networking device to cause the wireless networking device to operate with the target RF setting thereby enhancing performance of the wireless networking device.

2. The method of claim 1, wherein identifying the target RF setting comprises:
   performing, by the network device, a look-up in the RF setting knowledge base; and
   selecting, by the network device, based on a match between the weather metric and the plurality of predefined weather metrics, a performance-oriented RF setting of the plurality of performance-oriented RF settings as the target RF setting.

3. The method of claim 1, wherein the performance parameter measurement comprises one or more of a channel utilization or throughput.

4. The method of claim 3, wherein determining the performance metric comprises calculating a ratio of the throughput and the channel utilization.

5. The method of claim 1, wherein receiving the weather metric comprises downloading a weather report from a weather repository.

6. The method of claim 1, wherein receiving the weather metric comprises obtaining a weather measurement via a sensor installed with the wireless networking device.

7. The method of claim 1, wherein the wireless networking device is an indoor-type wireless networking device or an outdoor-type wireless networking device.

8. The method of claim 1, wherein the weather metric is indicative of a weather condition in a predefined area encompassing the wireless networking device.

9. The method of claim 1, wherein the target RF setting comprises a configuration corresponding to one or more of a transmit power, beamforming status, a fragment threshold, Aggregated Media Access Control Protocol Data Unit (AMPDU) size, or a Guard Interval (GI).

10. A network device, comprising:
    a machine-readable storage medium storing instructions; and
    a processing resource coupled to the machine-readable storage medium, wherein the processing resource is configured to execute one or more of the instructions to:

receive a weather metric corresponding to an outdoor access point (AP);
develop, during a training phase, an RF setting knowledge base comprising a mapping between a plurality of predefined weather metrics and a plurality of performance-oriented RF settings, wherein developing the RF setting knowledge base comprises:
receive the weather metric corresponding to the outdoor AP;
transmit a plurality of predetermined RF settings to the outdoor AP in response to determining that the weather metric has changed by a predetermined magnitude;
receive a performance parameter measurement from the outdoor AP corresponding to each of the plurality of predetermined RF settings;
determine a performance metric based on the performance parameter measurement;
select a predetermined RF setting of the plurality of predetermined RF settings based on the performance metric; and
store the weather metric and the predetermined RF setting in the RF setting knowledge base;
identify a target RF setting for the outdoor AP corresponding to the weather metric; and
transmit the target RF setting to the outdoor AP to cause the outdoor AP to operate with the target RF setting thereby enhancing a performance of the outdoor AP.

11. The network device of claim 10, wherein the outdoor AP communicates with a wireless device via a communication link extending outside a building hosting the outdoor AP.

12. The network device of claim 10, wherein the machine-readable storage medium stores the RF setting knowledge base, and wherein to identify the target RF setting, the processing resource is configured to execute one or more of the instructions to:
perform a look-up in the RF setting knowledge base; and
select, based on a match between the weather metric and the plurality of predefined weather metrics, a performance-oriented RF setting of the plurality of performance-oriented RF settings as the target RF setting.

13. The network device of claim 10, wherein the performance parameter measurement comprises one or more of a channel utilization or a throughput of the outdoor AP.

14. The network device of claim 13, wherein, to determine a performance metric, the processing resource is configured to execute one or more of the instructions to calculate a ratio of the throughput and the channel utilization.

15. A networked system, comprising:
an outdoor access point (AP);
a network device communicatively coupled to the outdoor AP, wherein the network device, wherein the network device is configured to;
receive a weather metric corresponding to an outdoor AP;
develop, during a training phase, an RF setting knowledge base comprising a mapping between a plurality of predefined weather metrics and a plurality of performance-oriented RF settings, wherein developing the RF setting knowledge base comprises:
receive the weather metric corresponding to the outdoor AP;
transmit a plurality of predetermined RF settings to the outdoor AP in response to determining that the weather metric has changed by a predetermined magnitude;
receive a performance parameter measurement from the outdoor AP corresponding to each of the plurality of predetermined RF settings:
determine a performance metric based on the performance parameter measurement;
select a predetermined RF setting of the plurality of predetermined RF settings based on the performance metric; and
store the weather metric and the predetermined RF setting in the RE setting knowledge base;
identify a target RF setting for the outdoor AP corresponding to the weather metric; and
transmit the target RF setting to the outdoor AP to cause the outdoor AP to operate with the target RF setting thereby enhancing a performance of the outdoor AP.

16. The networked system of claim 15, wherein the network device stores the RF setting knowledge base, and wherein to identify the target RF setting, the network device is configured to:
perform a look-up in the RF setting knowledge base; and
select, based on a match between the weather metric and the plurality of predefined weather metrics, a performance-oriented RF setting of the plurality of performance-oriented RF settings as the target RF setting.

* * * * *